July 28, 1953  P. A. NORDLUND  2,646,643

FISHING FLOAT

Filed Jan. 22, 1951

Inventor:
Par Adolf Nordlund

Patented July 28, 1953

2,646,643

UNITED STATES PATENT OFFICE 2,646,643

FISHING FLOAT

Per Adolf Nordlund, Stuvsta, Sweden

Application January 22, 1951, Serial No. 207,219
In Sweden May 2, 1949

1 Claim. (Cl. 43—43.11)

The present invention refers to a fishing float of the type to be used for cast-fishing and capable of letting out the amount of line desired for depth, when the cast is made and the float sides on the water.

The main object of the invention is to provide a simple and reliable mechanism for such floats which will permit easy adjustment of the amount of line to be let out and which will not need winding up of said amount of line on a spool within the float which may cause different troubles.

Figure 1:
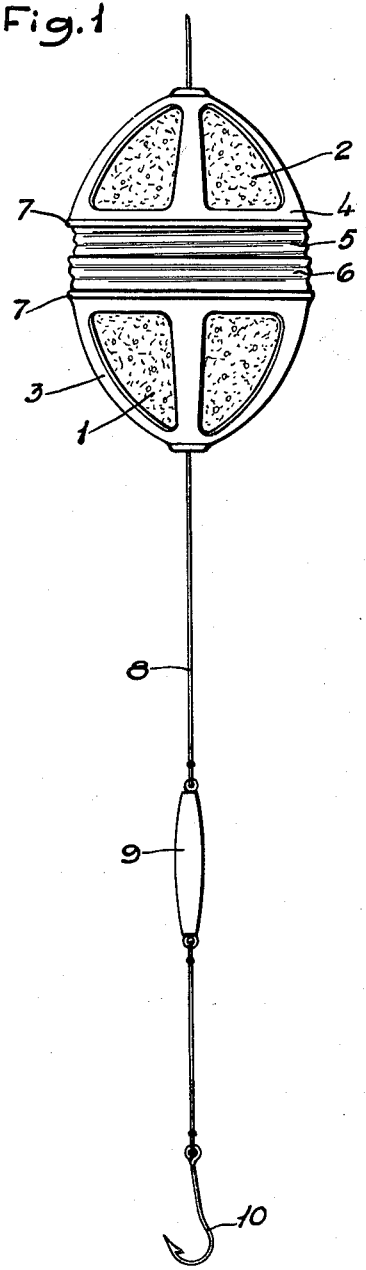
Figure 2:
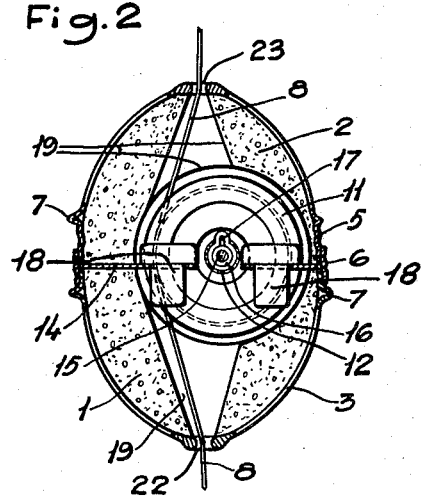
Figure 3:
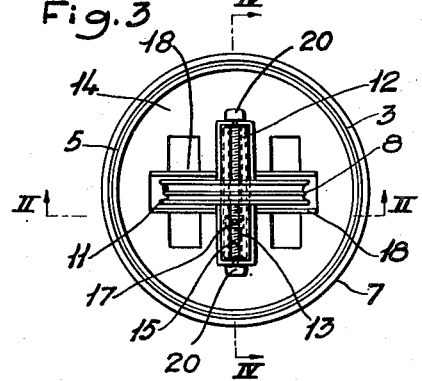
Figure 4:
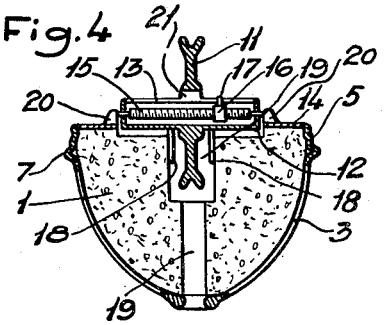

These and other objects will become apparent from the following description of a preferred embodiment of the invention illustrated in the accompanying drawing, where Fig. 1 shows an elevation of the float, lead and hook tackled onto the angling line, Fig. 2 shows a sectional elevation of the float taken along line II—II in Fig. 3, Fig. 3 shows a plan view of the lower part of the float, and Fig. 4 shows a sectional elevation of the lower part of the float with the line control mechanism as viewed from line IV—IV in Fig. 3, the shaft and runner being shown in full.

In the drawing, 1 designates the lower part of the hollow float comprising a cork body resting in a shell or cage 3. 2 denotes the upper part of the hollow float, which likewise comprises a cork body enclosed by an upper shell or cage 4. The shells or cages 3 and 4 are provided with threads 5 at their adjacent large ends, and are interconnected by means of a threaded rim 6 applied onto the threaded ends of the float members and keeping them together. 7 designates a bulge on the cages 3 and 4 for limiting the movements of the threaded rim 6. 8 is the fishing line, 9 is a lead on the line, and 10 is the hook.

The line control device included in the cavity 19 of the float comprises a line wheel 11 secured to a tubular member 12, which is rotatably mounted within the float. The fishing line 8 is passed around the wheel 11 so that the line will run through the float and cause the wheel and the tubular member to rotate when the line is taken in or payed out. Openings 21 and 22 respectively for the line 8 are arranged centrally in the top and the bottom of the float, and the tubular member 12 is slightly eccentrically arranged within the float.

The tubular member 12 carrying the line wheel 11 is provided at its ends with recesses for a threaded shaft 15 having its ends fixedly mounted in lugs 20 projecting upwardly from a mounting plate 14 covering the lower semi-spherical part 3 of the float. Along said threaded shaft 15 a threaded runner or nut 16 is movable and said runner is provided with a projecting pin 17, which is guided by the edges of a longitudinal slit 13 provided in the tubular member 12 so that the runner 16 will be caused to rotate and to move along the stationary threaded shaft 15 at the rotation of the line wheel 11 and the tubular member 12. In the line wheel 11 there is provided a through-recess 21 for the passage of the pin 17 during the movement of the runner 16 along the threaded shaft 15. 18 denotes guide plates extending upwardly and downwardly into the upper and lower parts of the float for retaining the mounting plate 14 and the cork bodies of the float in proper relative positions.

The float is operated in the following manner: After the float, lead and hook have been tackled onto the line, the float is opened to ascertain that the runner 16 is in its stop position at the extreme left of the threaded shaft 15. When such is the case the line wheel 11 is held fast, and the angling line is drawn out to the desired length while sliding on the stationary line wheel, whereupon the line wheel is released and the float closed and permitted to run down along the angling line toward the lead. The float running down the line will cause the line wheel to turn a number of revolutions corresponding to the amount of line covered by the float and since the wheel will bring the slitted tube 12 along in its rotary movement the pin 17 on the threaded runner 16 will be actuated and the runner screwed towards the right along the threaded shaft 15 for a distance depending on the length of the line passed. When the float comes down to the lead it is ready for being cast out. When the float reaches the water level, the lead 9 will, in cooperation with the bait, pull the line and thus screw the runner back to rest in the stop position to the left and thus the line will be drawn out to the pre-set depth.

When the float is raised out of the water, it is caused to run down along the line toward the lead by its own weight so that the runner is again returned to its free position and thus the float will again be conditioned for another cast.

The center of gravity of the control devices is situated offset from the center line of the float, which together with the weight of the lead causes te float to take an inclined position of approximately 25 degrees to the surface of the water, so that breaking points will be avoided on the line between the line wheel and the lead.

The angling float according to the invention may be cast either with a spinning rod or be delivered directly from the hand like a baseball.

The arrangement may obviously be varied with respect to the details thereof, without the principle of the invention being departed from.

I claim:

In a fishing float including a hollow buoyant body having openings for passing a fishing line therethrough, a line control device comprising a mounting within said float, an inner, threaded shaft rigidly secured at both ends thereof to said mounting laterally of the center line of the float, a runner threaded on to said inner shaft and having a pin projecting substantially radially therefrom, a rotatable tubular member coaxial with and enclosing said inner shaft, said tubular member having a longitudinal slit receiving said runner pin, and a line wheel rigidly mounted on said rotatable tubular member, said wheel receiving a turn of the fishing line in order to be rotated as the line moves through the float.

PER ADOLF NORDLUND.

References Cited in the file of this patent

UNITED STATES PATENTS

| Number | Name | Date |
|---|---|---|
| 541,789 | Kunzelman | June 25, 1895 |
| 1,973,028 | Thomas | Sept. 11, 1934 |
| 2,177,697 | Fairbanks et al. | Oct. 31, 1939 |
| 2,531,940 | Kirschman | Nov. 28, 1950 |